United States Patent [19]

Rello et al.

[11] Patent Number: 4,850,362
[45] Date of Patent: Jul. 25, 1989

[54] DOPPLER PERIPHERAL VASCULAR PROBE

[75] Inventors: Michael J. Rello, Harleysville; Richard B. Bernardi, Strafford, both of Pa.

[73] Assignee: Interspec, Inc., Conshohocken, Pa.

[21] Appl. No.: 57,169

[22] Filed: Jun. 2, 1987

[51] Int. Cl.$^4$ ............................................... A61B 8/00
[52] U.S. Cl. ........................... 128/660.05; 128/660.09; 128/662.04
[58] Field of Search .................... 73/618–621, 73/625–626, 632–633, 639, 861.25; 128/660–663, 660.05, 660.09, 662.04

[56] References Cited

U.S. PATENT DOCUMENTS

| | | | |
|---|---|---|---|
| 3,927,661 | 12/1975 | Takemura | 73/621 X |
| 4,097,835 | 6/1978 | Green | 73/626 X |
| 4,149,419 | 4/1979 | Connell, Jr. et al. | 73/621 |
| 4,151,834 | 5/1979 | Sato et al. | 73/619 X |
| 4,228,687 | 10/1980 | Fraser | 73/626 |
| 4,231,373 | 11/1980 | Waxman et al. | 73/621 X |
| 4,276,491 | 6/1982 | Daniel | 73/626 X |
| 4,281,549 | 8/1981 | Kretz | 73/626 |
| 4,287,767 | 9/1981 | Kretz | 73/625 |
| 4,399,703 | 8/1983 | Matzuk | 73/621 |
| 4,407,293 | 10/1983 | Suarez, Jr. et al. | 73/620 X |
| 4,424,813 | 1/1984 | Havlice et al. | 73/620 X |
| 4,508,122 | 4/1985 | Gardineer et al. | 73/620 X |
| 4,601,292 | 7/1986 | Fidel et al. | 73/625 X |
| 4,693,120 | 9/1987 | Robinson | 73/618 |

OTHER PUBLICATIONS

Marich, K. W. et al., "An Improved Medical UTS Imaging System for Scaning Peripheral Anatomy", UTS Imaging, vol. 3, No. 4, Oct. 1981, pp. 309–322.

*Primary Examiner*—Francis Jaworski
*Attorney, Agent, or Firm*—Ratner & Prestia

[57] ABSTRACT

An ultrasonic imaging system having imaging and Doppler displays. The imaging and Doppler transducers are scanned simultaneously and the Doppler transducer is stopped and triggered at a selected angle of its oscillation.

9 Claims, 4 Drawing Sheets

DOPPLER PERIPHERAL VASCULAR PROBE

BACKGROUND OF THE INVENTION

1. Field of the Invention

This invention relates to the field of ultrasonic scanning for medical applications, particularly devices for providing both imaging and Doppler data.

2. Prior Art

Numerous ultrasonic scanners are commercially available for diagnostic procedures. In one class of the scanners, an imaging display is presented for the operator. The operator selects a point in the imaging display with a cursor. An ultrasound beam is directed to the point and the echoes are processed to obtain the Doppler shift and thereby, a representation of the local blood flow at that point. A major application for these systems is to evaluate the effects of arteriosclerosis in the peripheral vascular system, primarily carotid, femoral and popliteal arteries. Obstructions in the peripheral vascular system result in locally accelerated blood flow and increased turbulence. Possible areas containing plaque within the lumen of vessels can be identified in the imaging data. The increased velocity of the blood through these obstructed areas may then be studied using the Doppler signal. See for example U.S. Pat. No. 4,141,347 issued Feb. 27, 1979 to Green.

It is known in the prior art to rotate a transducer past an acoustic window which is in contact with the body and to obtain data for an imaging display. When the operator locates an area within the imaging display requiring Doppler examination, the imaging transducer is stopped and a Doppler transducer is aimed at the area of interest and Doppler data is obtained. This method, however, does not provide sufficient accuracy of Doppler examination and does not permit simultaneous Doppler and imaging data.

Another prior art system, also having separate imaging and Doppler transducers, permits more precise alignment by providing continuous motion of the imaging transducer while allowing manual positioning of the Doppler transducer. See for example U.S. Pat. No. 4,407,293, issued Oct. 4, 1983 to Suarez. The position of the Doppler transducer in the system is adjusted by means of a knob on the hand-holdable probe. However, such systems may require separate encoders for the imaging transducer and the Doppler transducer in order to permit accurate determination of the position of each transducer. Additionally, these systems are inconvenient to operate because, while one hand of the operator is required to constantly hold the probe in position on the patient, the operator's other hand must be moved back and forth between the control panel of the ultrasound system and the manual positioning knob on the hand-holdable probe.

BRIEF SUMMARY OF THE INVENTION

An ultrasonic imaging system constructed in accordance with the invention has a probe with a hand-holdable housing and a fluid chamber within the housing. An imaging transducer and a separate Doppler transducer, each mounted for scanning motion within the fluid chamber, transmit and receive ultrasound pulses to provide imaging data and Doppler data, respectively. The system also includes circuitry for firing the imaging transducer at selected times within its range of scanning and conditioning the imaging transducer to receive reflections to provide imaging data and for firing the Doppler transducer at a specific selected angle within its range of scanning and conditioning the Doppler transducer to receive reflections to provide Doppler data.

DETAILED DESCRIPTION OF THE INVENTION

Figure 1:
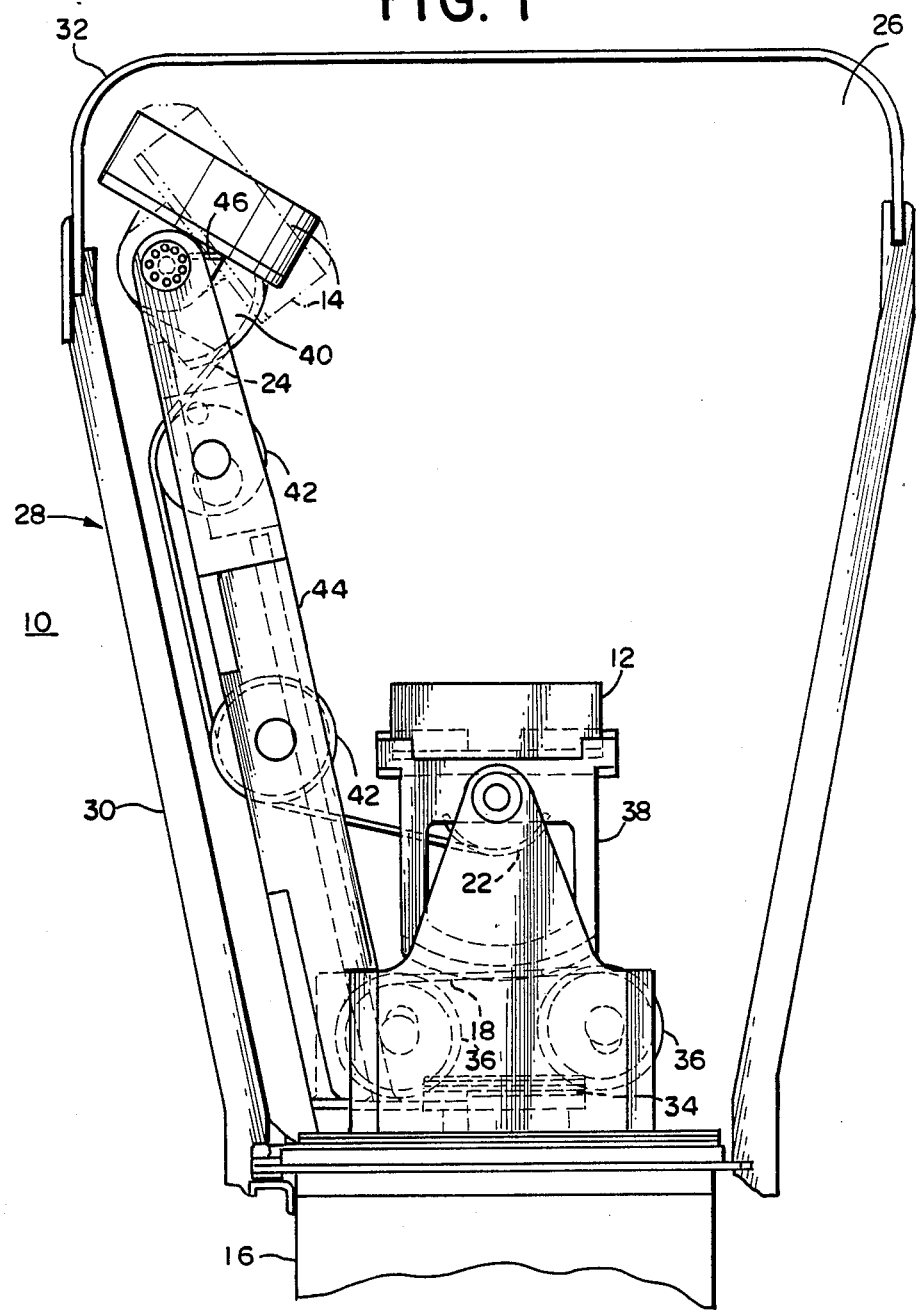
FIG. 1 shows the hand-holdable probe of the system of the present invention.
Figure 2:
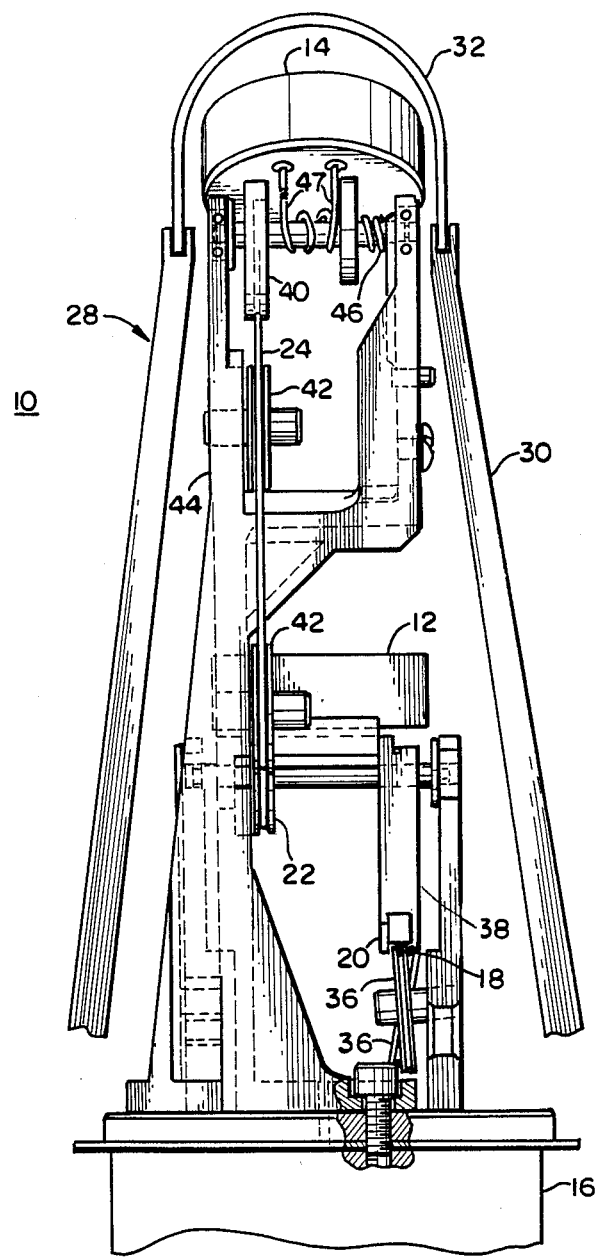
FIG. 2 shows a side view of the probe of FIG. 1.

Referring now to FIGS. 1 and 2, there is shown a hand-holdable probe 10 of the system of the present invention. Probe 10 includes an imaging transducer 12 for producing imaging data and a Doppler transducer 14 for producing Doppler data. Imaging transducer 12 and Doppler transducer 14 both are driven by a single oscillating motor 16. Motor 16 directly drives imaging transducer 12 in an oscillatory fashion by way of a primary cable 18 and a primary pulley cable sheave 20. Doppler transducer 14 is driven by way of a secondary cable sheave 22, which is fixed with respect to primary pulley cable sheave 20, and by a secondary cable 24 which is fixed to sheave 22.

Imaging transducer 12 and Doppler transducer 14 are mounted within a fluid chamber 26 formed by a housing 28. Housing 28 is formed of walls 30 and a flexible acoustic window 32. Window 32 fits together with walls 30 to provide a fluid-tight seal. Acoustic window 32 is flexible so that its shape can change when placed in contact with a patient. Because of the changing shape of flexible acoustic window 32, the angle of incidence of the ultrasound pulses transmitted by transducers 12 and 14 is not fixed and the distance that the ultrasound pulses travel through the fluid in fluid chamber 26 changes. It is, therefore, important that the velocity of the ultrasound pulses in the fluid contained within fluid chamber 26 match, as nearly as possible, the velocity of the ultrasound pulses in the tissue under study to prevent these changes from distorting the data display.

A cable drive pulley 34 is directly coupled to motor 16 and is arranged to rotate back and forth over a selected range of travel. Primary cable 18 is fixed to cable drive pulley 34 to provide drive for primary cable 18.

Primary cable 18 is wound around primary cable idler pulleys 36 to change the horizontal motion of cable drive pulley 34 to substantially vertical motion and to align primary cable 18 with primary pulley cable sheave 20. In order to translate this motion from a horizontal plane to a substantially vertical plane and to correctly align cable 18, pulleys 36 are disposed at slight angles to the vertical as shown in FIG. 2.

Imaging transducer 12 is mounted on an assembly 38 which is driven by means of sheave 20. When primary cable 18 is properly aligned with sheave 20 and is driven by motor 16, assembly 38 oscillates, thereby oscillating imaging transducer 12. The angle of oscillation of assembly 38 is selected to be approximately thirty degrees by selection of the appropriate relative sizes of the various pulleys and sheaves.

Secondary pulley sheave 22 is fixed to assembly 38. Therefore, as assembly 38 oscillates through its range of motion, secondary pulley sheave 22 also oscillates. Secondary cable 24, as previously described, is fixed to secondary cable drive sheave 22, thereby causing secondary cable 24 to move as assembly 38 moves. Secondary cable 24 may be fixed to secondary cable sheave 22 by a screw.

Secondary cable 24, at its opposite end, is terminated to a secondary pulley cable sheave 40 and when pulled downwardly causes secondary pulley cable sheave 40 to rotate clockwise for the orientation shown in FIG. 1. This movement of secondary cable 24 is transmitted to secondary pulley cable sheave 40 by way of a pair of spaced-apart secondary cable idler pulleys 42 mounted on an upwardly projecting arm 44. A torsion return spring 46 biases sheave 40 in a counterclockwise direction, thereby returning transducer 14 and keeping tension in secondary cable 24. A pair of flying leads 47 permit transducer 14 to oscillate while remaining electrically coupled to the electronics of the system of the present invention.

Figure 3:
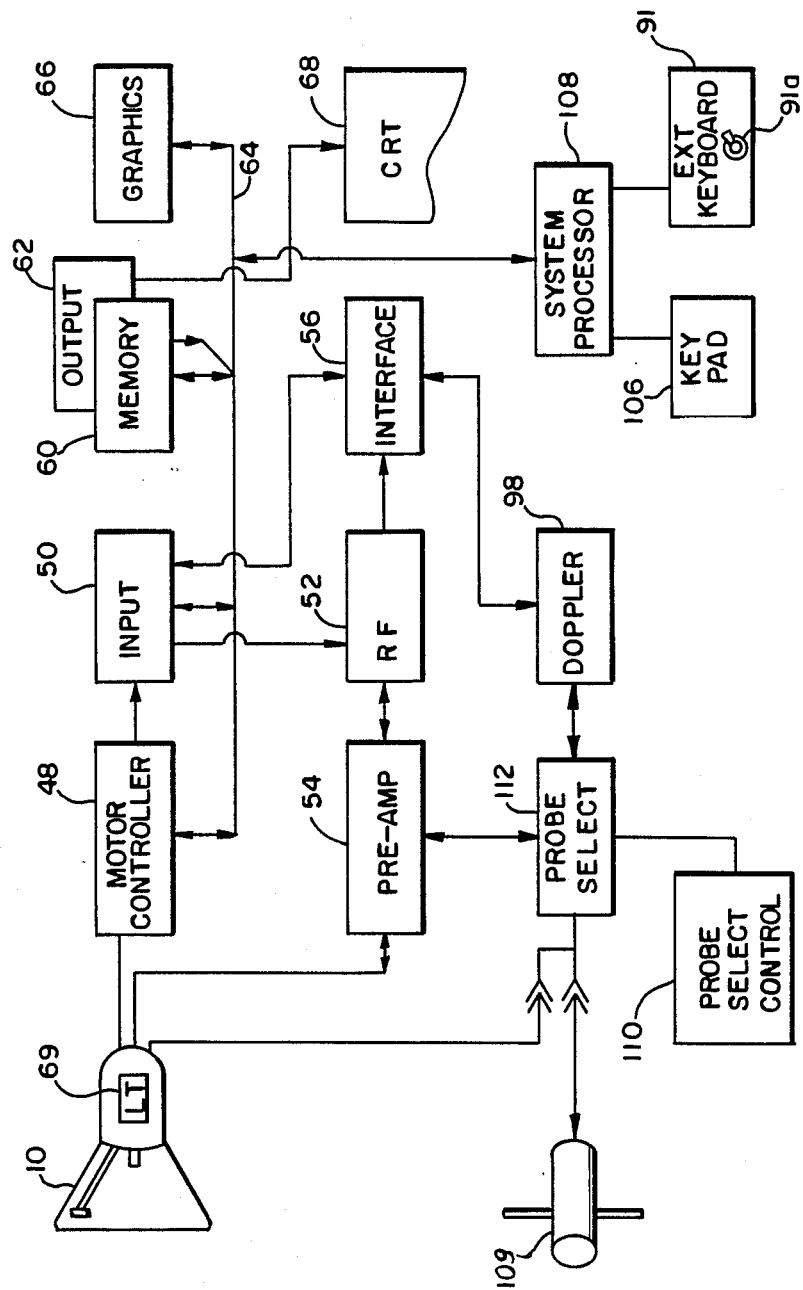
FIG. 3 shows a block diagram representation of the system of the present invention.

Referring now to FIG. 3, there is shown a block diagram of the system of the present invention. Probe 10 of the system of the present invention includes an oscillating imaging transducer and an oscillating Doppler transducer as previously described. The system of the present invention also includes the circuitry required to control the movement of the imaging transducer and the Doppler transducer as well as to control the timing of ultrasound pulses from these transducers.

A motor controller board 48 generates addresses for the motor of probe 10. A single movement in one direction from one limit of the motor to the other limit of the motor is divided into, for example, one hundred and twenty-eight positions. Each position has a corresponding address. During imaging operation, pulsing of the imaging transducer is provided at each address. The one hundred and twenty-eight rays together form a sector which is displayed by the system of the present invention. A movement back in the opposite direction is likewise divided into the same one hundred and twenty-eight positions and a pulsing of the imaging transducer is also provided at each address while this transducer is travelling in the opposite direction. Each of these one hundred and twenty-eight addresses is sequentially produced by motor controller 48.

Each of the one hundred and twenty-eight addresses also is provided to an input board 50. Each time a new position is provided to input board 50 from motor controller 48, input board 50 generates an automatic gating interval signal (AGI). Input board 50 applies the AGI signal to an RF board 52. When RF board 52 receives the AGI signal from input board 50, RF board 52 provides a signal to a pre-amp board 54. In response to the signal from RF board 52, pre-amp board 54 provides a signal to the imaging transducer of probe 10 causing the imaging transducer to fire. Pre-amp board 54 and RF board 52 then switch into the receive mode and receive and process information back from the imaging transducer produced by the firing of the imaging transducer.

The information received back from the imaging transducer is related to the movement of an ultrasound pulse from the imaging transducer outwardly through window 32 and its reflection back from an object outside of probe 10. The reflected ultrasound pulse received by the imaging transducer is converted back into an electrical signal by the imaging transducer. This signal is applied to pre-amp board 54 and amplified by pre-amp board 54 and applied to RF board 52.

RF board 52 processes the received information and transmits it to an interface board 56. Interface board 56 provides such functions as conversion from analog to digital and transmission of digital information to input board 50. Input board 50, a memory 60 and an output board 62, communicating by way of a back plane 64, perform digital scan conversion. Digital scan conversion includes such operations as conversion from polar to Cartesian coordinates. Information thus developed is further processed by a graphics board 66 and displayed on a cathode ray tube 68.

A linear transformer (LT) 69, coupled to the armature of motor 16 within probe 10, senses the position of the armature and provides to motor controller 48 information on the position of the armature. The information on the position of the armature of motor 16 represents the positions of the imaging transducer and the Doppler transducer. Because the imaging transducer and the Doppler transducer are driven in unison by the oscillations of a single motor 16, the movements of the imaging transducer and the Doppler transducer are exactly synchronous and there is a one-to-one correspondence between the angular position of the imaging transducer and the angular position of the Doppler transducer. Thus, the single return position signal provided to motor controller 48 from linear transformer 69 communicates the position of both transducers simultaneously.

Figure 4:
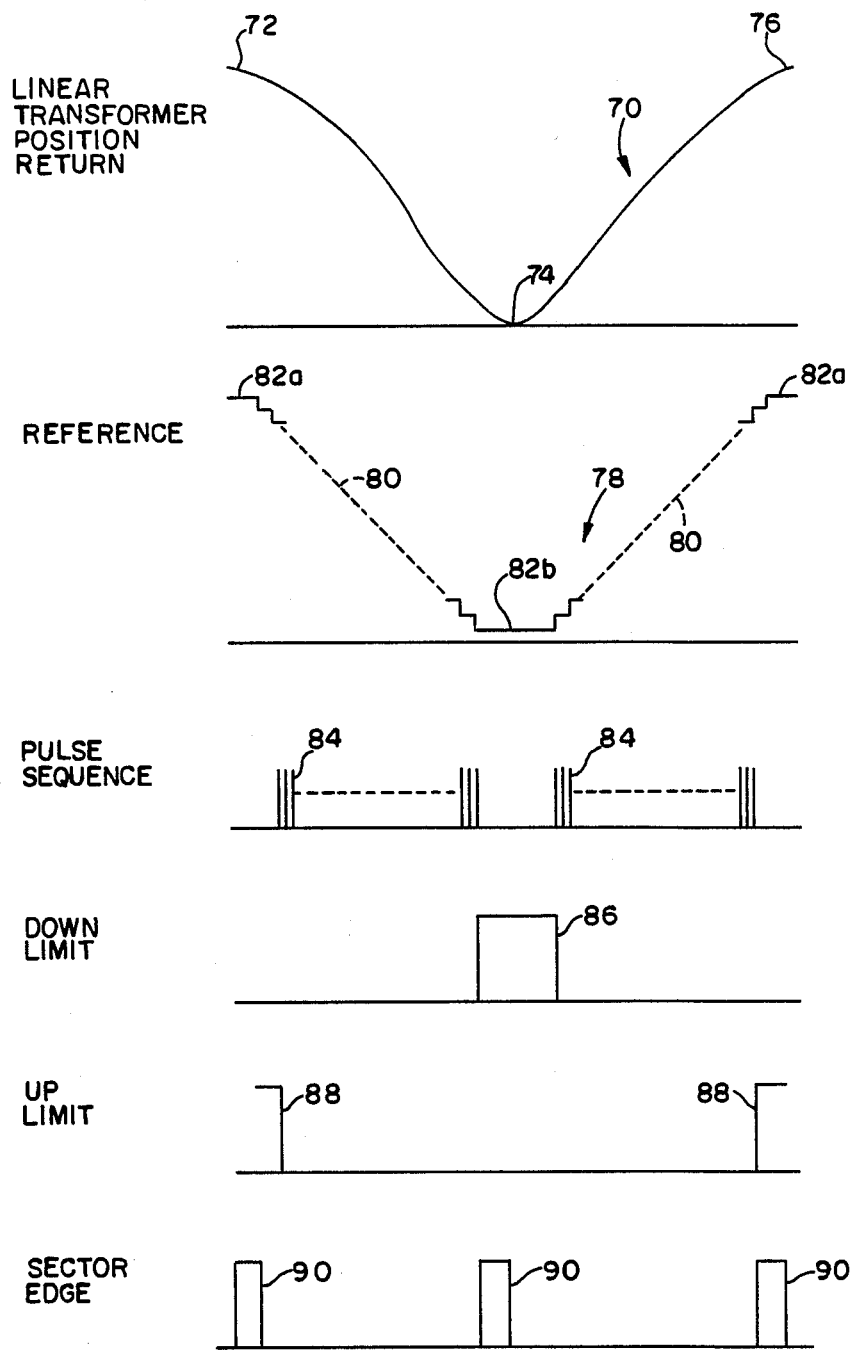
FIG. 4 shows timing diagrams for the system of FIG. 3.

The position information derived from linear transformer 69 is shown in FIG. 4 as linear transformer position return signal 70. As the imaging transducer and the Doppler transducer are driven in one direction by motor 16 during imaging operation, linear transformer position return signal 70 proceeds from point 72 to point 74. As the imaging transducer and the Doppler transducer are driven in the opposite direction by motor 16, linear transformer position return signal 70 proceeds from point 74 to point 76.

Thus, each full cycle of linear transformer position return signal 70 during imaging operation corresponds to a movement from one limit of motor 16 to the other limit of motor 16 and back again. This movement back and forth corresponds to a full oscillation of the Doppler transducer as well as a full oscillation of the imaging transducer.

A reference signal, generated by motor controller 48, is shown in FIG. 4 as reference signal 78. Reference signal 78 proceeds in a step-wise manner in regions 80 where each region 80 includes one hundred and twenty-eight steps or voltage levels for the example given. Each step or voltage level corresponds to one of the one hundred and twenty-eight addresses through which motor 16 passes during each movement from one limit to the other limit. The alternating stepping-up and stepping-down of the addresses within regions 80 cause motor 16 to reverse directions and oscillate as previously described.

At each one of the one hundred and twenty-eight addresses which correspond to individual steps or voltage levels of reference signal 78, a pulsing of the imaging transducer is provided as previously described. This is identified in FIG. 4 as pulse sequence. No addresses are generated by motor controller 48 during turnaround periods 82a and 82b, and no pulses are generated during turnaround periods 82a and 82b.

Each time a new address is produced by motor controller 48 and provided to input board 50, motor controller 48 generates a pulse 84 as shown in FIG. 4. Each pulse 84 generated by motor controller 48 is sequentially applied to input board 50 and RF board 52 and causes the imaging transducer to fire. No pulses 84 are generated by motor controller board 48 during turnaround periods 82a and 82b, but a down limit pulse 86, shown in FIG. 4, is generated during turnaround period 82b and an up limit pulse 88, shown in FIG. 4, is provided during turnaround period 82a. From down limit pulse 86 and up limit pulse 88, input board 50 generates sector edge pulses 90 shown in FIG. 4. Thus, whenever the imaging transducer reaches an end of its travel in one direction and is turning around, a sector edge pulse 90 is provided by input board 50. Sector edge pulse 90 is used to synchronize transitions from one mode of operation to another.

During m mode operation, imaging transducer is positioned at one fixed address as indicated to the system of the present invention by the operator by means of a joy stick 91a which is located on an external keyboard 91. Joystick 91a causes a line superimposed on the sector display of cathode ray tube 68 to move to different locations on the sector display to provide to the operator visual display information regarding where, within the sector, the m mode reading is to be taken.

To position the imaging transducer at the location requested with the joystick, the voltage level of reference signal 78 corresponding to the requested location is provided by motor controller 48. Feedback information from linear transformer 69 regarding the current location of the imaging transducer is received by motor controller 48 in the form of linear transformer position return signal 70 in the same manner as that described for imaging operation. However, in the m mode the imaging transducer must come to a complete stop before firing.

Motor controller 48 compares linear transformer return signal 70 received from linear transformer 69 with the desired address as indicated by the level of reference signal 78 and moves the imaging transducer in one direction or the other until the voltage levels are substantially equal and the imaging transducer is in the position requested by the operator. Thus, during m mode operation linear transformer 69 and motor controller 48 form a servo loop for positioning the imaging transducer.

When the imaging transducer is in the required position, as determined by motor controller 48, the transducer is fired by way of pre-amp board 54 as previously described and information is received back from the transducer by way of pre-amp board 54 and processed by RF board 52, also as previously described.

When the system of the present invention is in the Doppler mode, motor controller 48 positions the Doppler transducer in a manner similar to that previously described for the positioning of the imaging transducer during m mode operation. This positioning includes a mapping of the angular positions of the imaging transducer into the angular positions of the Doppler transducer where there is a one-to-one correspondence between the angle of the imaging transducer and the angle of the Doppler transducer because the two transducers are coupled to each other by way of secondary cable 24. Thus, for each position of the imaging transducer there is one and only one corresponding position of the Doppler transducer.

An angular position is selected for the Doppler transducer using the joystick as previously described for the position of the imaging transducer during m mode operation. The selected angular position corresponds to one of the one hundred and twenty-eight addresses generated by motor controller 48. Motor controller 48 controls the movement of the Doppler transducer to the selected angle by providing the voltage level of the address corresponding to the selected angle and reading the linear transformer position return signal 70 provided by linear transformer 69. Motor controller 48 then adjusts the position of the imaging transducer, and thereby the position of the Doppler transducer, until the linear transformer position return signal 70 is equal to the voltage level of the address corresponding to the selected angle.

When the Doppler transducer is fully stopped at the requested position, as determined by the servo control, comprising motor controller 48 and linear transformer 69, interface board 56 applies a signal to pre-amp board 54 by way of RF board 52 causing pre-amp board 54 to enable a firing of the Doppler transducer. The signal causing the Doppler transducer to fire is generated by a Doppler module 98 and is applied to probe 10. The data received back from the Doppler transducer of probe 10 after the Doppler transducer fires is received by Doppler module 98. This information is formatted and applied to interface board 56 by Doppler module 98.

The information received back from the Doppler transducer and applied to interface board 56 by Doppler module 98 is in the same format as the information applied to interface board 56 by RF board 52 when RF board 52 received information from the imaging transducer. Thus, interface board 56 receives formatted information on the firing of an ultrasound transducer without regard to whether the information comes from the imaging transducer and is formatted by RF board 52 or from the Doppler transducer and is formatted by Doppler module 98. The information received by interface board 56 from Doppler module 98 is then processed as previously described for the information received by interface board 56 from RF board 52.

During duplex Doppler operation the system of the present invention performs a sector scan as previously described for imaging operation. Following the sector scan, the imaging and Doppler transducers are fully stopped in a Doppler angle position selected by the operator and the Doppler transducer is fired as previously described for Doppler operation. When Doppler information from the Doppler transducer is received and processed by Doppler module 98 and applied to interface board 56, the imaging transducer is moved to the nearest sector edge and another sector update is performed as previously described for imaging operation.

Thus, when the system is in duplex mode operation, it switches back and forth between an operation similar to that described for imaging mode and an operation similar to that described for the Doppler mode. In a predetermined manner, the sector update is immediately followed by the positioning and firing of the Doppler transducer. An interval of firing of the Doppler transducer, comprising multiple acoustic pulses, is immediately followed by another sector update.

The system of the present invention may be switched from one mode to another by means of switches on a keypad 106. Keypad 106 applies signals to system a processor 108 which communicates with the other boards of the system by way of backplane 64 to configure the system to operate in the mode selected.

The system of the present invention may also operate with a conventional Doppler imaging probe without a separate Doppler transducer. This can be accomplished by replacing probe 10 with a conventional single-transducer probe. Even though this probe does not include a separate Doppler transducer, the system of the present invention may be programmed to control the single transducer of this probe in the manner described for control of either the imaging or the Doppler transducer of probe 10, thereby deriving either imaging or Doppler data from the probe.

The system of the present invention may also operate with a Doppler-only probe, identified in FIG. 3 by reference numeral 109. Probe 109, rather than probe 10, is selected by means of a probe select control board 110 which applies a signal to a probe select board 112.

Although the present invention has been described in connection with a system in which the scanning motions of the transducers is oscillatory, the underlying concepts of the present invention can be applied to systems in which the scanning motions of the transducers is other than oscillatory. For example, the imaging/Doppler probe of the present invention can be incorporated in a system in which the scanning motions of the imaging transducer and the Doppler transducer are rotary.

The foregoing has set forth exemplary and preferred embodiments of the present invention. It will be understood, however, that various alternatives will occur to those of ordinary skill in the art without departure from the spirit or scope of the present invention.

We claim:

1. An ultrasonic imaging and Doppler measurement probe comprising:
    a hand-holdable housing;
    a fluid chamber within said housing;
    a first ultrasonic transducer mounted within said fluid chamber for scanning motion about a first axis and having a frequency characteristic optimized for transmitting and receiving ultrasound pulses to provide imaging data;
    a second ultrasonic transducer mounted within said fluid chamber for scanning motion about a second axis and having a frequency characteristic optimized for transmitting and receiving ultrasound pulses to provide Doppler data;
    and a single motor coupled to both said first ultrasonic transducer and said second ultrasonic transducer for imparting scanning motion to said first ultrasonic transducer and said second ultrasonic transducer.

2. An ultrasonic imaging and Doppler measurement probe according to claim 1 further including position sensing means for developing a single signal representative of the positions of both said first ultrasonic transducer and said second ultrasonic transducer.

3. An ultrasonic imaging and Doppler measurement probe according to claim 2 wherein said first ultrasonic transducer and said second ultrasonic transducer are mounted for oscillatory scanning motion and said motor is an oscillating motor.

4. An ultrasonic imaging and Doppler measurement apparatus comprising:
    a hand-holdable probe including:
    (a) a first ultrasonic transducer having a frequency characteristic optimized for transmitting and receiving a first series of ultrasound pulses to provide imaging data,
    (b) a second ultrasonic transducer having a frequency characteristic optimized for transmitting and receiving a second series of ultrasound pulses to provide Doppler data,
    (c) means for mounting said first ultrasonic transducer for scanning movement about a first axis,
    (d) means for mounting said second ultrasonic transducer for scanning movement about a second axis, and
    (e) single drive means coupled to said first transducer and to said second transducer for imparting scanning movement to said first transducer and to said second transducer;
    means for selecting an angular position within the range of scanning movement of said second transducer;
    and means coupled to said selecting means for positioning said second transducer at said selected angular position.

5. An ultrasonic imaging and Doppler measurement apparatus according to claim 4 wherein:
    (a) said selecting means include means for providing a control signal representative of said selected angular position, and
    (b) said positioning means include:
        (i) position sensing means within said probe and responsive to said drive means for developing a single angular position signal representative of the angular positions of both said first ultrasonic transducer and said second ultrasonic transducer,
        (ii) means for comparing said control signal and said angular position signal, and
        (iii) means for coupling said comparing means to said drive means to position said second ultrasonic transducer at said selected angular position.

6. An ultrasonic imaging and Doppler measurement apparatus according to claim 5 wherein said first ultrasonic transducer and said second ultrasonic transducer are mounted for oscillatory scanning motion and said drive means include an oscillating motor.

7. An ultrasonic imaging and Doppler measurement apparatus according to claim 6 wherein said motor is mounted with its output shaft disposed along a third axis perpendicular to both said first axis and said second axis, and said drive means include means for translating the oscillatory motion of said motor about said third axis into scanning movement of said transducers about said first and said second axes.

8. An ultrasonic imaging and Doppler measurement system comprising:
    a hand-holdable probe having:
    (a) an imaging transducer mounted to scan over a predetermined angle about a first axis for transmitting and receiving a first series of pulses to provide imaging data,
    (b) a Doppler transducer mounted to scan over a predetermined angle about a second axis for transmitting and receiving a second series of pulses to provide Doppler data, and
    (c) a single motor coupled to said imaging transducer and said Doppler transducer for imparting scanning movement to said imaging transducer and said Doppler transducer;
    means for selecting a specific angle within the scan range of said Doppler transducer to obtain Doppler data at said specific angle;

means responsive to said selecting means for controlling said motor to position said Doppler transducer at said specific angle;
and means for:
(a) firing said imaging transducer at selected times within the scan range of said imaging transducer to transmit said first series of pulses and conditioning said imaging transducer to receive reflections of said first series of pulses, and
(b) firing said Doppler transducer at said specific angle to transmit said second series of pulses and conditioning said Doppler transducer to receive reflections of said second series of pulses.

9. The system of claim 8 wherein said probe further includes position sensing means for providing a signal representative of the positions of said Doppler transducer and said imaging transducer and said controlling means are responsive to said selecting means and said positioning sensing means to position said Doppler transducer at said specific angle.

* * * * *